A. OSKAMP.
MOLDING MACHINE.
APPLICATION FILED FEB. 1, 1906.
908,318.
Patented Dec. 29, 1908.
6 SHEETS—SHEET 5.
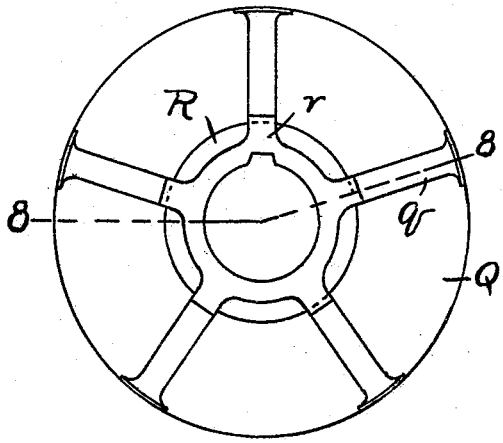
FIG. 5.
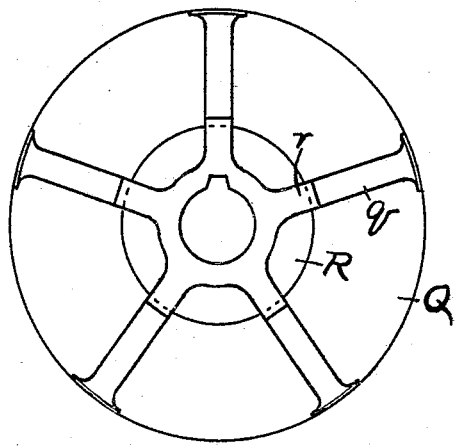
FIG. 6.
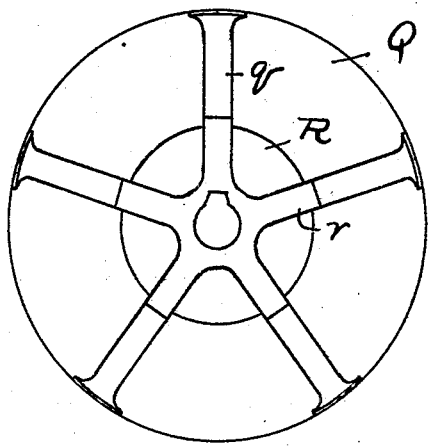
FIG. 7.
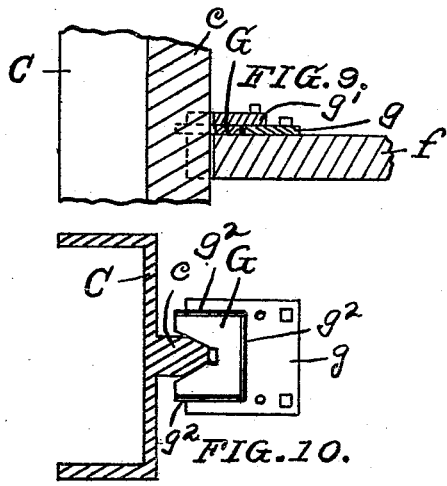
FIG. 9.
FIG. 10.
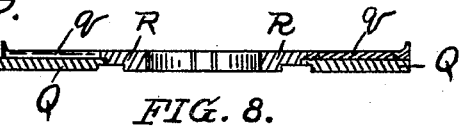
FIG. 8.
Witnesses
Agnes B. Grant.
Theo W. Meader.
Inventor
Alfred Oskamp
By Parkinson & Richards
Attorneys

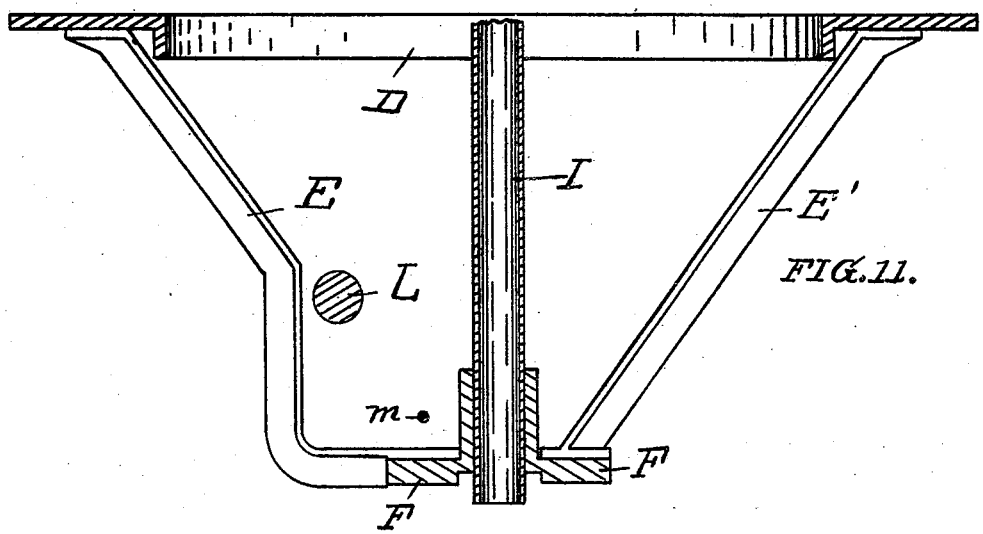
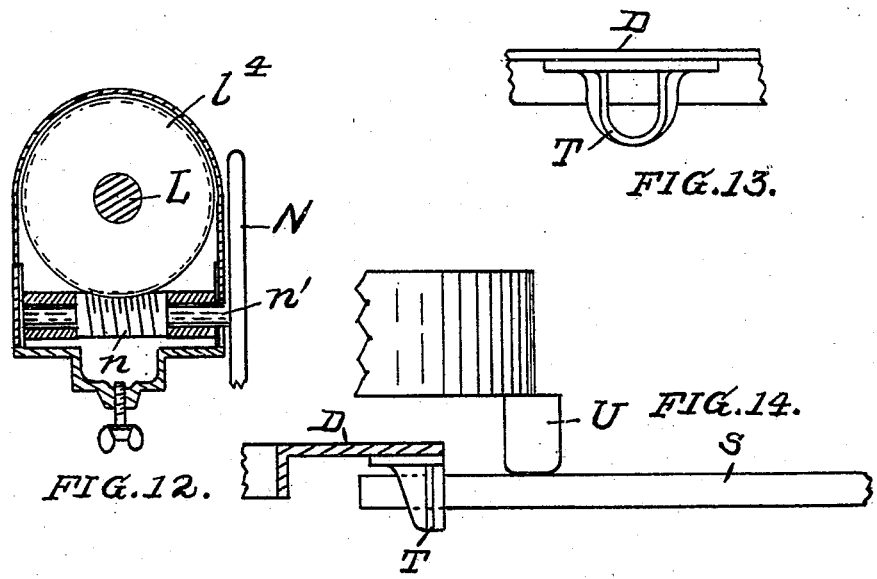

UNITED STATES PATENT OFFICE.

ALFRED OSKAMP, OF WYOMING, OHIO, ASSIGNOR TO THE KISINGER-ISON COMPANY, OF CINCINNATI, OHIO.

MOLDING-MACHINE.

No. 908,318.   Specification of Letters Patent.   Patented Dec. 29, 1908.

Application filed February 1, 1906. Serial No. 298,991.

*To all whom it may concern:*

Be it known that I, ALFRED OSKAMP, a citizen of the United States, residing at Wyoming, in the county of Hamilton and State of Ohio, have invented certain new and useful Improvements in Molding-Machines, of which the following is a specification.

The object of my invention is to provide a molding machine of improved construction and especially adapted to the manufacture of pulleys.

My invention consists in the combination and arrangement of parts hereinafter described and claimed.

Figure 1:
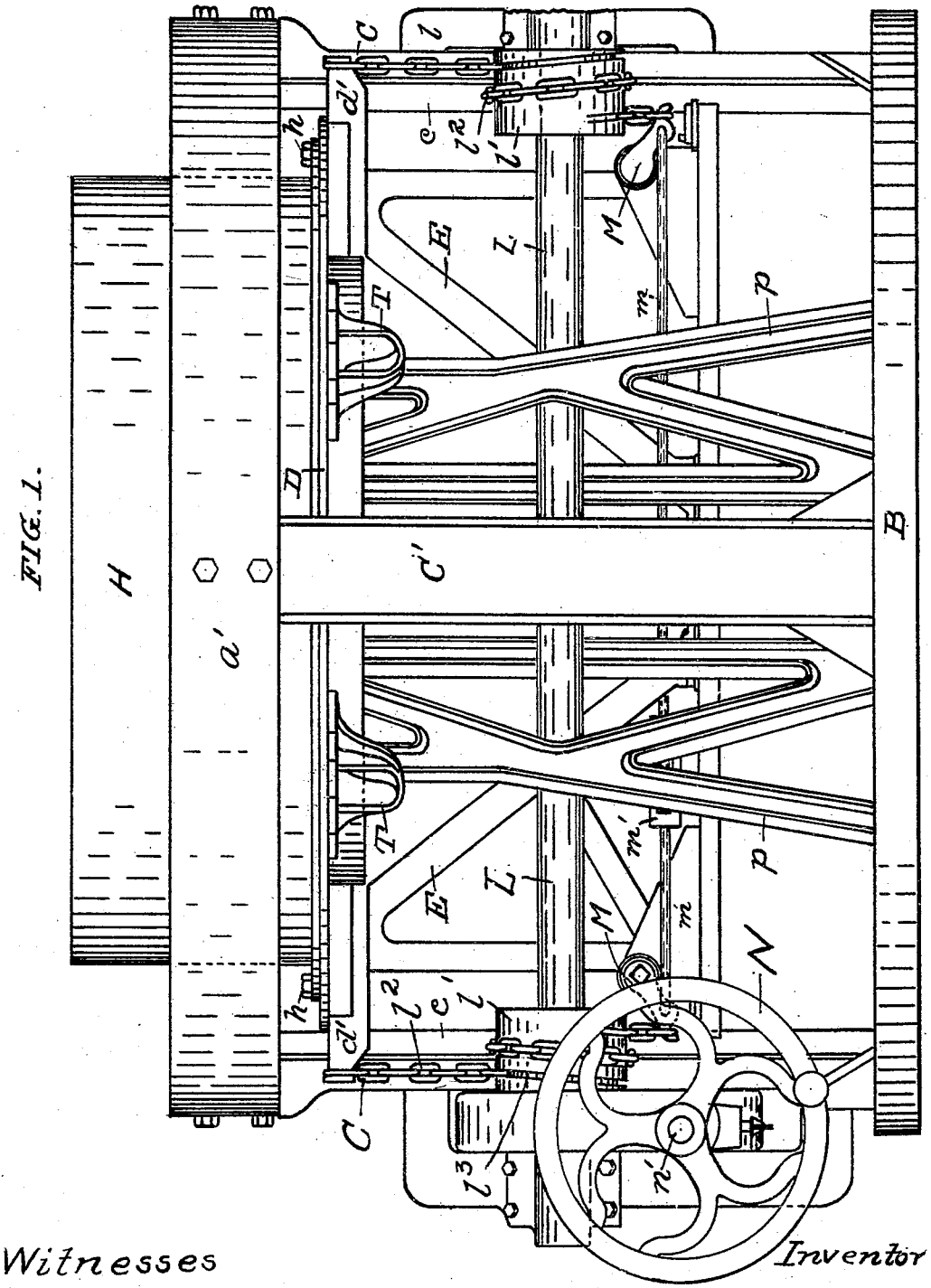
Figure 2:
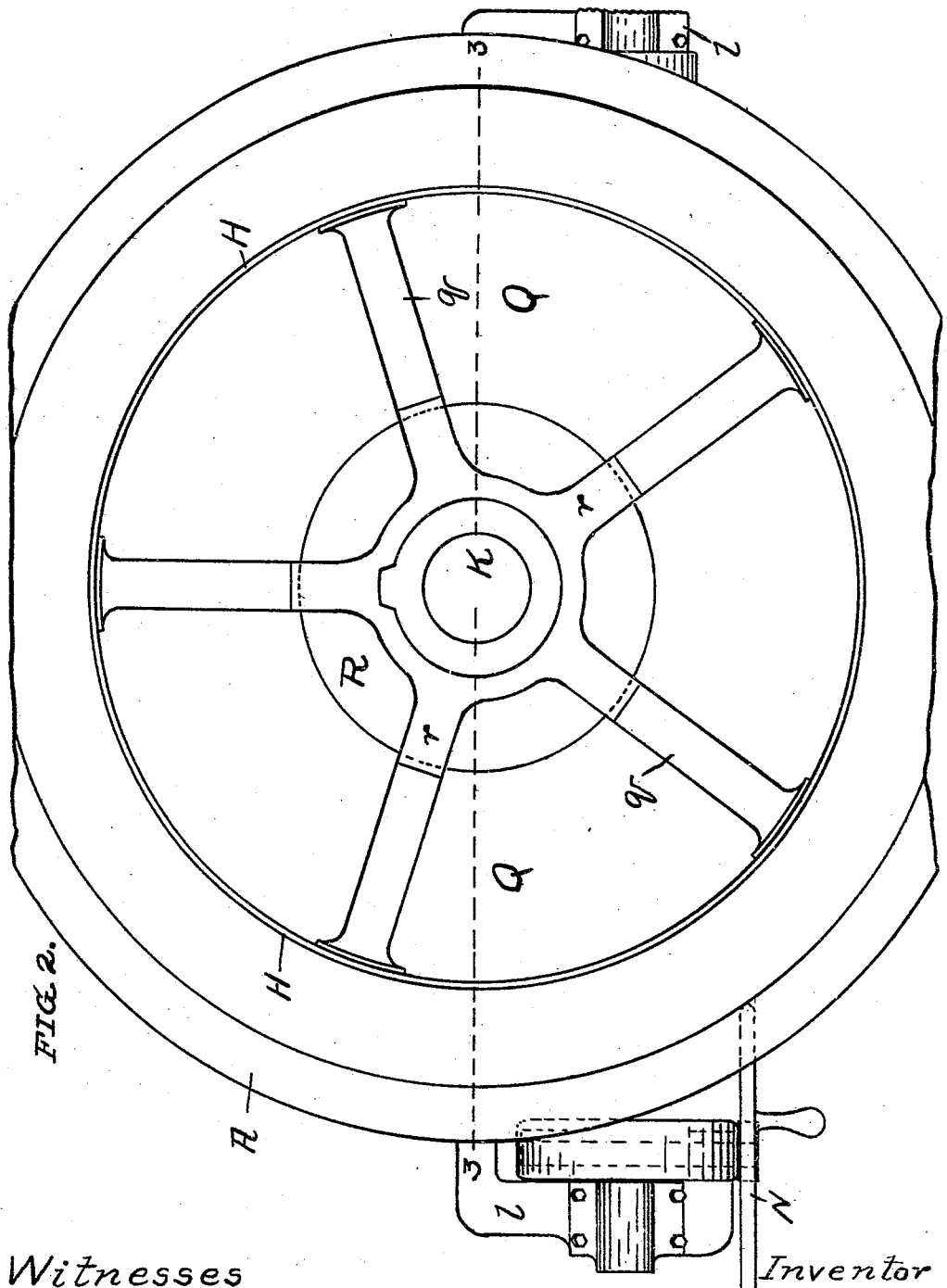
Figure 3:
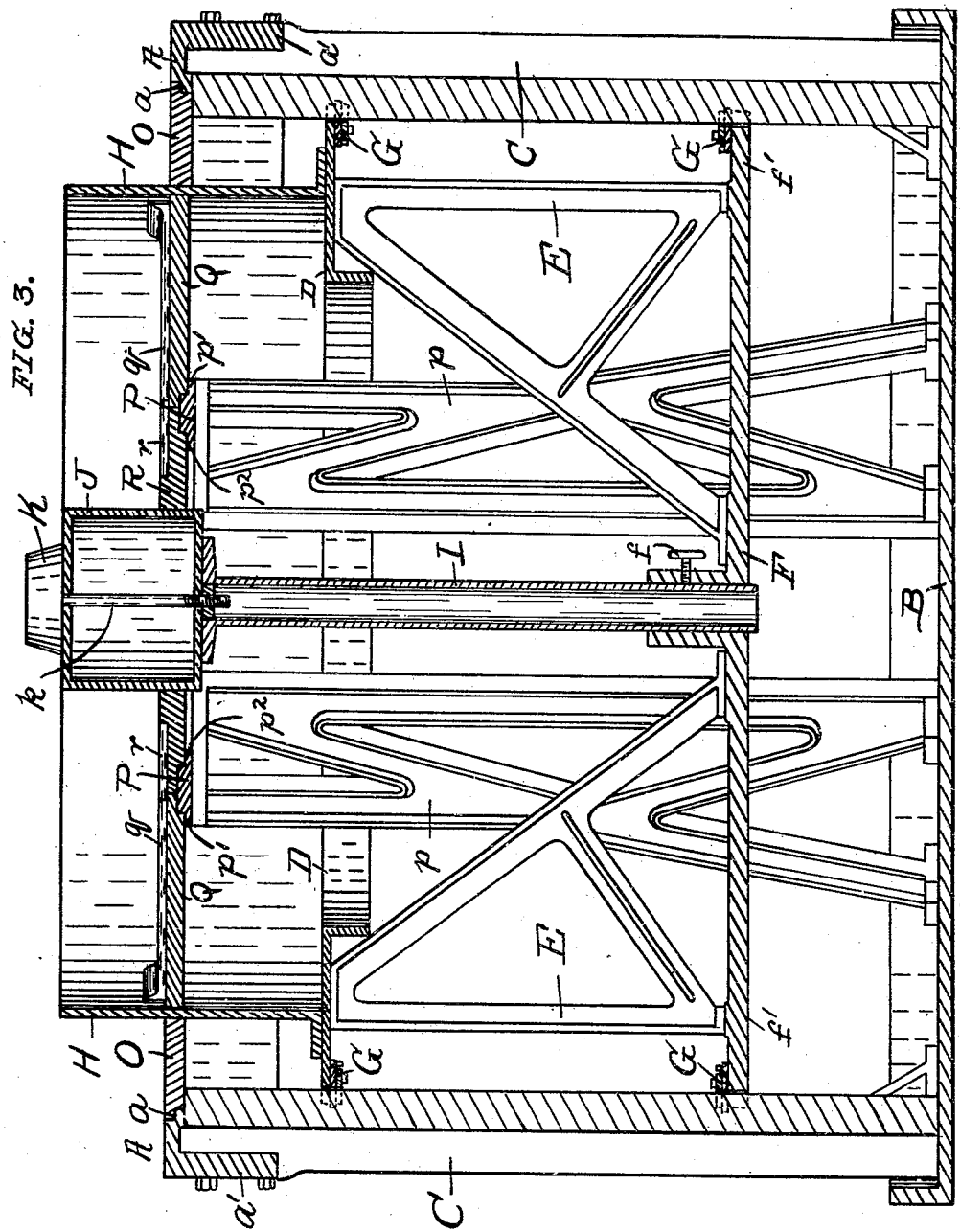
Figure 4:
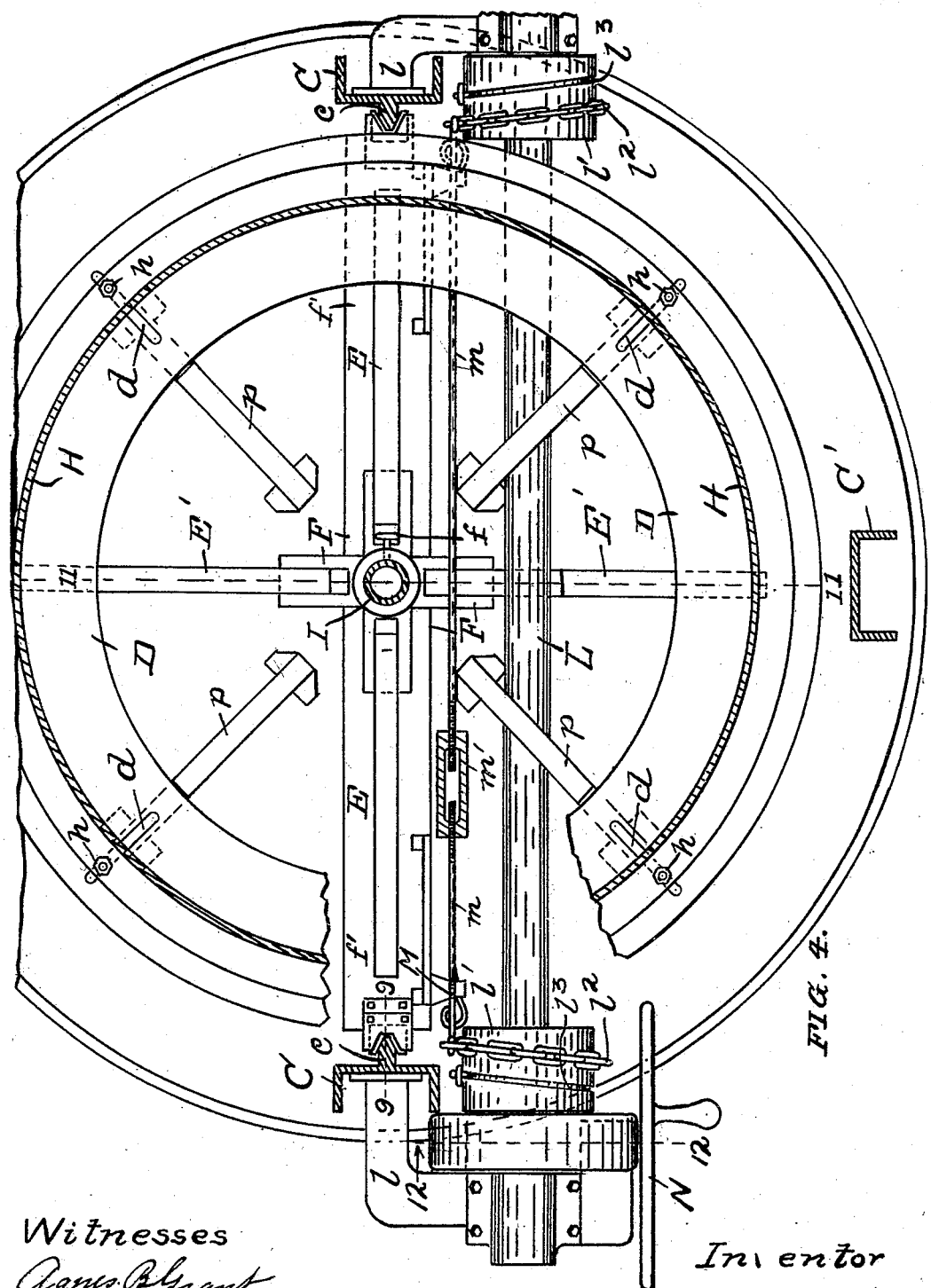

In the drawings, Figure 1, is an elevation of a machine embodying my invention; Fig. 2, a partial top plan view of the same; Fig. 3, a section on line 3—3 of Fig. 2; Fig. 4, a horizontal section of the machine with portions broken away; Figs. 5, 6, and 7 are plan views, on a reduced scale, of the spoke pattern plate for one diameter of pulley with three different sized hubs; Fig. 8, a section on line 8—8 of Fig. 5; Fig. 9, an enlarged section on line 9—9 of Fig. 4; Fig. 10, a sectional plan view of Fig. 9; Fig. 11, a partial section on line 11—11 of Fig. 4; Fig. 12, a section on line 12—12 of Fig. 4; Fig. 13, an elevation of the stirrup for starting the machine in case of jamming; and Fig. 14, an elevation showing the use of a block and lever in connection with the stirrup.

A molding table A is supported on a suitable base plate B by means of standards C and C'. The table A consists of a narrow annular plate provided with an annular shoulder $a$ and a depending flange $a'$. Standards C and C' are in the form of channel beams having comparatively wide dimensions in a direction parallel to the tangent on the edge of the table A adjacent to their positions of attachment and standards C have vertical guides $c$ on their inner faces. The wide dimensions of the standards greatly stiffen the structure in the four directions and in conjunction with the flange $a'$ form a rigid structure which is open for access to the interior.

An annular table D is mounted in the interior of the structure on standards E and E' supported on a spider F. Guide plates G are secured to table D and spider F and run on guides $c$. The guide plates G lie within a substantially U-shaped plate $g$ and are held therein by a cover plate $g'$. Adjusting plates $g^2$ may be inserted on either side or behind plates G to nicely adjust them to guides $c$. By this construction it will be seen that table D and spider F are guided at four widely separated points which insures their accurate movements. Table D is provided with slots $d$ by means of which rim patterns H, of different sizes, may be secured thereto, by bolts $h$. Spider F also carries a hollow post I which may be adjusted in height by means of hand screw $f$. Hub patterns J, of different sizes may be secured to post I by means of bolts $k$ carried by core prints K. A shaft L is mounted in suitable standards $l$ and carries chain drums $l'$ at either end. At opposite ends of arms $f''$ of spider F are mounted swinging arms M connected with chains $l^2$ which run in grooves $l^3$ in drums $l$ and are connected with arms $d'$ on table D. It will be seen that the spider F which supports the table D is supported by the chains $l^2$. Arms M are connected by a rod $m$ whose length may be adjusted by turn buckle $m'$ and thus the normal tension in the chains equalized and slack or lost motion taken up. The swinging arms afford sufficient play to equalize the tension when the chains are in operation. At one end shaft L carries a worm wheel $l^4$ meshing with a worm gear $n$ on a shaft $n'$ which is operated by a hand wheel N. By this arrangement, it will be seen that the relative positions of the rim patterns and hub patterns and the extent of their projection above the table A may be adjusted. On the outside of rim pattern H is placed an external stripping plate O which rests on shoulder $a$ flush with table A and nicely fits the exterior of the rim pattern. In the interior of the rim pattern and on standards $p$, is mounted a supporting table P having exterior and interior shoulders $p'$ and $p^2$. The upper ends of standards $p$ have vertical sides and fit within the central opening in table D so as to permit reciprocation thereof, and the lower portions are spreading in form to increase their strength and stiffness. An interior stripping plate Q, carrying half patterns $q$ of the outside ends of the pulley spokes, rests upon shoulder $p'$ with its upper surface flush with table A, and its exterior edge nicely fitting the interior of the rim pattern. A hub stripping plate R carrying half patterns $r$ of the inside ends of the spokes, rests upon shoulder $p^2$ with its surface flush with table A and its inner edge nicely fitting the exterior of the hub patterns. The table, D, is provided with a plurality of equidistant lever bearings or stirrups, T, adapted to receive levers, S, which may be fulcrumed upon blocks, U, placed between the levers and the edge of the fixed tables.

In use a rim pattern H of size corresponding to the desired pulley is secured to table D and the desired sized hub pattern K secured to post I which is adjusted to give the desired depth of hub. By means of hand wheel N the rim and hub patterns are adjusted to project from the surface of table A to one half the desired width of rim and depth of hub. Stripping plates O, Q and R are then placed in position completing the half pattern. A half flask is then placed on table A around rim pattern H and sand packed around the parts projecting from the table surface. Then by means of hand wheel N the rim and hub patterns are withdrawn through the stripping plates, leaving a mold of one half of the pulley. The rim and hub patterns are then returned to position, to produce the desired pattern for the other half of the mold which is obtained as before. By putting the two half molds together a mold for a complete pulley is obtained as will be readily understood by those skilled in the art. Should the rim patterns stick or bind in the half molds, levers are inserted in each of the stirrups, T. By working these levers gently and concurrently with gradually increasing force, the binding spot can be readily located and the pattern loosened.

In order to form pulleys having the same rim diameter but different sized hubs I provide a series of hub stripping plates all designed to fit within the interior stripping plate Q but having different sized hub openings as indicated in Figs. 5, 6 and 7. By this arrangement it will be seen that by changing the hub pattern and hub stripping plate and without change of the rim pattern and stripping plates, pulleys of the same driving diameter but with different sized hub may be readily formed.

While I have illustrated and described the preferred mechanism for carrying my invention into effect, this is capable of variation without departing from the spirit of the invention. I therefore do not wish to be limited to the exact construction set forth, but What I claim as new and desire to secure by Letters Patent is:—

1. In a molding machine, the combination of a table; a base plate; channeled standards at the edges of the table and supporting the table on the base plate; guides on two oppositely disposed standards; a frame carrying pattern members; guide plates on the frame and engaging the guides at different points; a rotatable shaft; drums on opposite ends of the shaft; flexible connections wrapping upon the drums and having their free ends attached to the pattern frame on opposite sides of the shaft; and a connection between the end attachments of the flexible connections adapted to transmit tension from one to the other, substantially as specified.

2. As a means for operating movable pattern portions of a molding machine, the combination of a movable frame carrying the movable pattern portions; a rotatable shaft; drums on opposite ends of the shaft; flexible connections wrapping on the drums; attaching members on the frame on one side of the shaft and adapted to engage one free end of the flexible connections; movable attaching members on the frame on the other side of the shaft and adapted to engage the other free ends of the flexible connections; and a connection between the movable attaching members whereby tension on one causes tension on the other, substantially as specified.

3. As a means for operating movable pattern portions of a molding machine, the combination of a movable frame carrying the movable pattern portions; a rotatable shaft; drums on opposite ends of the shaft; flexible connections wrapping on the drums; attaching members on the frame on one side of the shaft and adapted to engage one free end of the flexible connections; movable attaching members on the frame on the other side of the shaft and adapted to engage the other free ends of the flexible connections; and an adjustable connection between the movable attaching members whereby tension on one causes tension on the other, and lost motion may be taken up, substantially as specified.

4. As a means for operating movable pattern portions of a molding machine, the combination of a movable frame carrying the movable pattern portions; a rotatable shaft; drums on opposite ends of the shaft; chains wrapping on the drums; attaching members on the frame on one side of the shaft and adapted to engage one free end of the chains; swinging arms on the frame on the other side of the shaft and adapted to engage the other free ends of the chains; and an adjustable rod connecting the swinging arms, substantially as specified.

5. In a pulley molding machine, the combination of table A supported on channeled standards C and C'; guides c on standards C; table D having a central opening and supported on spider F by standards E and E'; adjustable guide plates G on table D and spider F; rim pattern H supported on table D; adjustable post I on spider F; hub pattern J secured on post I by means of core print K having a bolt k taking into post I; table P supported on standards p passing through the central opening of table D; stripping plate O, Q and R; and means for operating table D and spider F, substantially as specified.

6. In a pulley molding machine, the combination of table A supported on channeled standards C and C'; guides c on standards C; table D having a central opening and supported on spider F by standards E and E'; adjustable guide plates G on table D and spider F; rim pattern H supported on table D; adjustable post I on spider F; hub pattern J secured on post I by means of core print K having a bolt $k$ taking into post I; table P supported on standards $p$ passing through the central opening of table D; stripping plate O, Q and R; shaft L carrying drums $l'$; swinging arms M on spider F; chains $l^2$ passing over drums $l'$ and secured to table D and arms M; rod $m$ connecting arms M; and hand wheel N for operating shaft L, substantially as specified.

7. In a molding machine, the combination of a molding table; a movable frame carrying a pattern member adapted to project from the molding table; means for reciprocating the pattern frame; a plurality of equidistant lever bearings under the pattern member adapted to be utilized in starting the movement of the frame; and a plurality of levers adapted to coöperate with the bearings, substantially as specified.

8. In a pulley molding machine, the combination of table A supported on channeled standards C and C'; guides c on standards C; table D having a central opening and supported on spider F by standards E and E'; guide plates G on table D and spider F; U-shaped plates $g$ embracing plates G; adjusting plates $g^2$; cover plate $g$; rim pattern H supported on table D; adjustable post I on spider F; hub pattern J secured on post I by means of core print K having bolt $k$ taking into post I; table P supported on standards $p$ passing through the central opening of table D; stripping plates O, Q and R; shaft L carrying drums $l'$; swinging arms M on spider F; chains $l^2$ passing over drums $l'$ and secured to table D and arm M; rod $m$ connecting arms M and provided with a turn buckle $m'$ for adjusting its length; and hand wheel N for operating shaft L, substantially as specified.

9. In a pulley molding machine, the combination of table A supported on channeled standards C and C'; guides c on standards C; table D having a central opening and supported on spider F by standards E and E'; guide plates G on table D and spider F; U-shaped plates $g$ embracing plates G; adjusting plates $g^2$; cover plate $g$; rim pattern H supported on table D; adjustable post I on spider F; hub pattern J secured on post I by means of core print K having bolt $k$ taking into post I; table P supported on standards $p$ passing through the central opening of table D; stripping plates O, Q and R; shaft L carrying pulley $l'$; swinging arms M on spider F; chains $l^2$ passing over drums $l'$ and secured to table D and arm M; rod $m$ connecting arms M and provided with a turn buckle $m'$ for adjusting its length; hand wheel N for operating shaft L; and stirrup T for starting the movement of the frame, substantially as specified.

ALFRED OSKAMP.

Witnesses:
   AGNES B. GRANT,
   BRAYTON G. RICHARDS.